(12) United States Patent
Lemke et al.

(10) Patent No.: US 8,807,112 B2
(45) Date of Patent: Aug. 19, 2014

(54) ROLLING THRUST BEARING CONSTRUCTIONS

(75) Inventors: James U. Lemke, La Jolla, CA (US); Patrick R. Lee, San Diego, CA (US); William B. McHargue, Encinitas, CA (US); Bryant A. Wagner, San Diego, CA (US)

(73) Assignee: Achates Power, Inc., San Diego, CA (US)

( * ) Notice: Subject to any disclaimer, the term of this patent is extended or adjusted under 35 U.S.C. 154(b) by 439 days.

(21) Appl. No.: 12/931,497

(22) Filed: Feb. 2, 2011

(65) Prior Publication Data

US 2011/0186005 A1 Aug. 4, 2011

Related U.S. Application Data

(60) Provisional application No. 61/337,372, filed on Feb. 3, 2010, provisional application No. 61/337,370, filed on Feb. 3, 2010.

(51) Int. Cl.
*F02B 75/32* (2006.01)

(52) U.S. Cl.
USPC .................................... 123/197.1; 123/197.5

(58) Field of Classification Search
USPC ................. 123/197.1, 197.5, 197.2
See application file for complete search history.

(56) References Cited

U.S. PATENT DOCUMENTS

| | | | |
|---|---|---|---|
| 1,775,108 A * | 9/1930 | Omo | 123/50 R |
| 1,796,603 A | 3/1931 | Junkers | |
| 2,237,113 A | 4/1941 | Plumb | 122/51 |
| 2,260,240 A | 10/1941 | Taylor | 309/19 |
| 2,357,031 A | 8/1944 | Stabler | 123/51 |
| 3,316,889 A * | 5/1967 | Jean-Baptiste Sanmori | 123/51 BB |
| 4,305,349 A | 12/1981 | Zimmerly | 123/51 BB |
| 5,115,725 A * | 5/1992 | Horiuchi | 92/157 |
| 5,261,359 A | 11/1993 | Hull | 123/65 |
| 5,794,582 A * | 8/1998 | Horiuchi | 123/197.2 |
| 6,354,745 B1 | 3/2002 | Ai | 384/565 |
| 6,651,607 B2 * | 11/2003 | Towler | 123/197.3 |
| 7,156,056 B2 | 1/2007 | Lemke et al. | 123/41.35 |
| 7,360,511 B2 | 4/2008 | Lemke et al. | 123/41.35 |

(Continued)

FOREIGN PATENT DOCUMENTS

| | | |
|---|---|---|
| DE | 1004860 | 3/1957 |
| EP | 0 122 299 A1 | 10/1984 |

(Continued)

OTHER PUBLICATIONS

International Search Report and Written Opinion for PCT/US2011/000189, mailed Aug. 2, 2011.

(Continued)

*Primary Examiner* — Noah Kamen
*Assistant Examiner* — Long T Tran

(57) ABSTRACT

A piston rolling thrust bearing construction is constituted of a pair of bearing plates with opposing faces disposed in a spaced alignment with a rolling ball assembly positioned between the opposing faces to support relative movement between the bearing plates. The piston rolling thrust bearing is mounted to the open end of the skirt of a piston disposed in a cylinder to compensate for non-axial motion relative to the cylinder axis due to the articulating motions of connecting elements or any structural misalignments within an engine drive train assembly.

20 Claims, 13 Drawing Sheets

(56) References Cited

U.S. PATENT DOCUMENTS

| | | | |
|---|---|---|---|
| 7,452,134 B2 | 11/2008 | Burner et al. | 384/481 |
| 7,469,664 B2 * | 12/2008 | Hofbauer et al. | 123/54.1 |
| 7,578,267 B2 | 8/2009 | Hofbauer et al. | 123/51 |
| 7,625,128 B2 | 12/2009 | Gillespie | 384/535 |
| 2008/0107369 A1 * | 5/2008 | Fujita et al. | 384/463 |
| 2009/0116780 A1 * | 5/2009 | Davis | 384/590 |
| 2009/0139476 A1 | 6/2009 | Hofbauer et al. | 123/55.2 |
| 2011/0186017 A1 | 8/2011 | Lemke et al. | 123/51 R |

FOREIGN PATENT DOCUMENTS

| | | |
|---|---|---|
| EP | 0 449 278 A1 | 2/1991 |
| EP | 0 449 278 A1 | 3/1991 |
| GB | 183501 | 8/1922 |
| GB | 308905 | 4/1928 |
| GB | 558115 | 12/1943 |
| GB | 562635 | 8/1944 |
| GB | 757552 | 9/1956 |
| GB | 779726 | 7/1957 |

OTHER PUBLICATIONS

International Search Report and Written Opinion for PCT/US2011/000188, mailed May 7, 2012.

"The Commer 'TS3' Diesel Engine", Commer Cars. Pub. No. 566, 9/54.

* cited by examiner

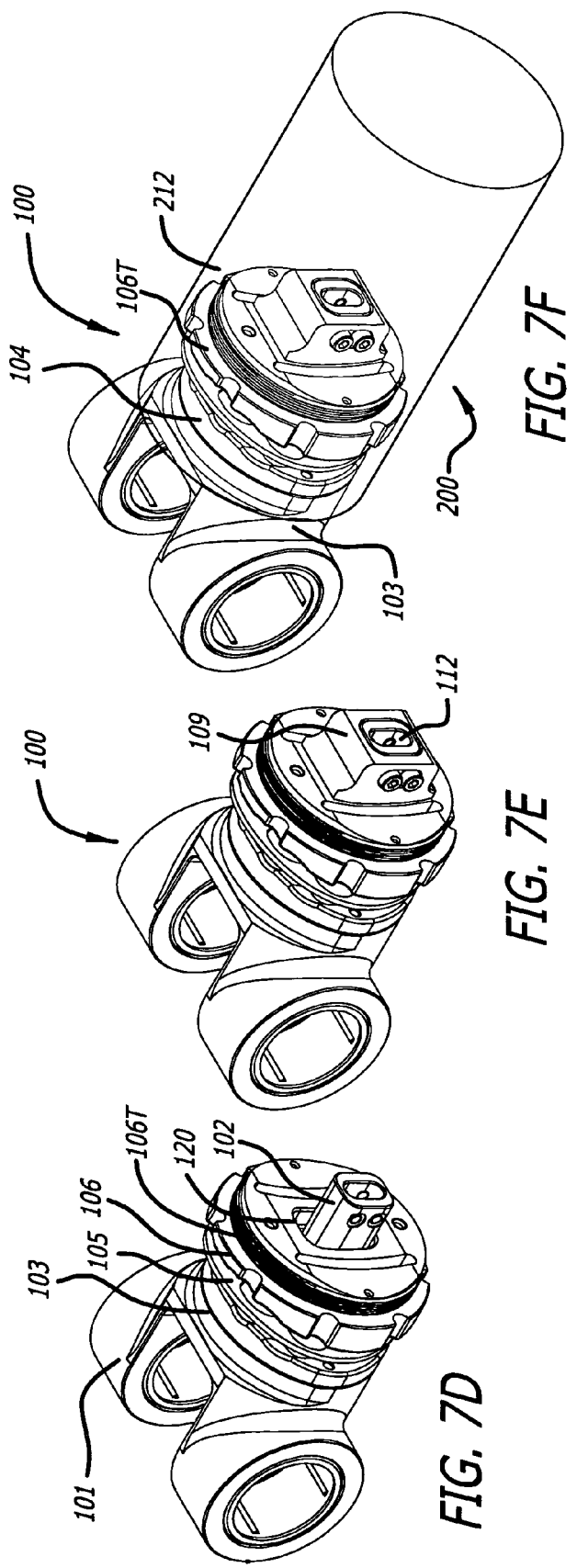

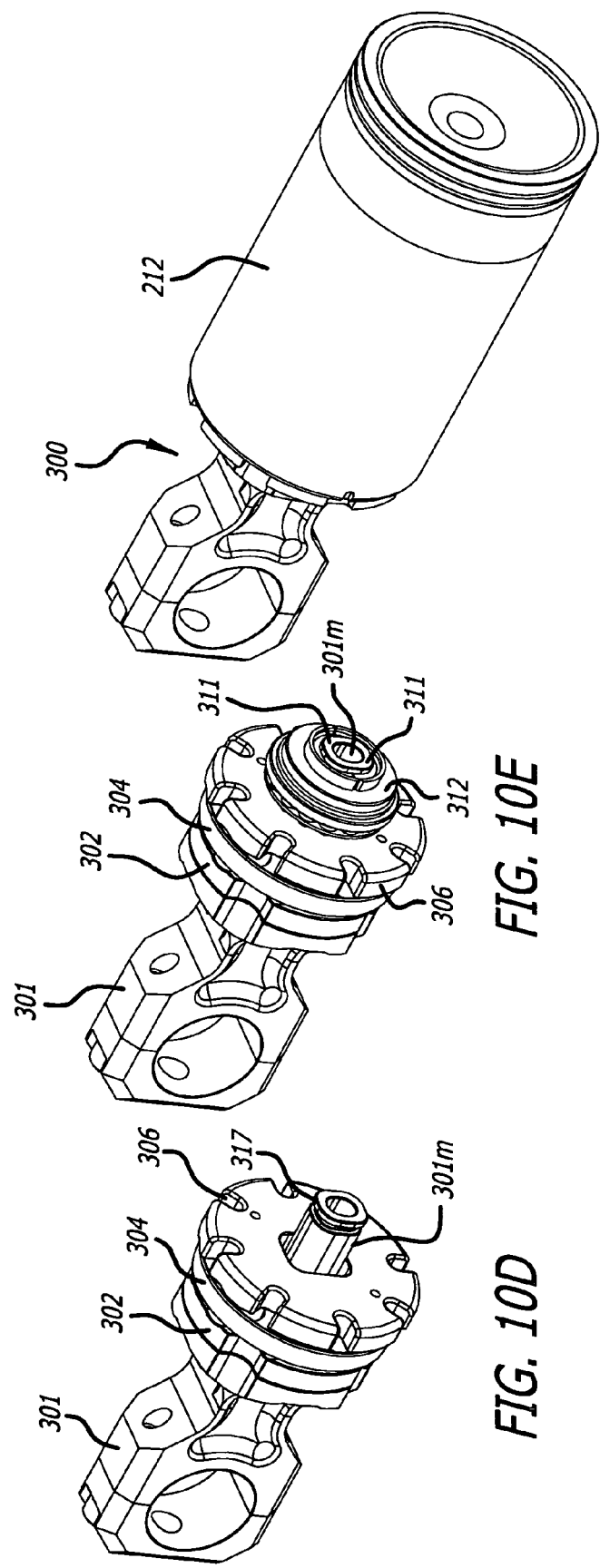

ROLLING THRUST BEARING CONSTRUCTIONS

PRIORITY

This application claims benefit of U.S. provisional application for patent 61/337,370, filed Feb. 3, 2010 and to U.S. provisional application for patent 61/337,372, filed Feb. 3, 2010.

BACKGROUND

The field relates to thrust bearings, particularly to rolling thrust bearings. The field also relates to rolling thrust bearings for pistons used in internal combustion engines. More particularly, this field covers piston rolling thrust bearing constructions for coupling a piston to connecting linkage of an internal combustion engine.

Opposed-piston diesel engines have an acknowledged potential for superior performance according to standard measures of output power and fuel efficiency. For example, the Rootes-Lister diesel engine (also known as the Commer 'TS3' diesel) illustrated in FIG. 1 advanced two-stroke engine construction by way of an engine configuration which included three pairs of opposed pistons driving a single crankshaft. Each piston was coupled to a respective crankpin by a rocker assembly. Each rocker assembly included a rocker arm pivoted between two ends, a piston rod connected to a first end of the rocker arm and to a wrist pin located inside the piston, and a connecting rod connecting the second end of the rocker arm to a crankpin. All of the rocker assemblies were identical, with each rocker arm end being pivoted to the engine frame. The architecture of the rocker assemblies significantly reduced side forces acting on the pistons, thereby making the engine very durable. However, at least one construction feature severely compromised the performance of the Rootes-Lister engine.

In the Rootes-Lister engine wrist pins ("gudgeon" pins, UK) were mounted inside the pistons, which limited the size of the bearings for the pins, and therefore the ultimate load bearing capacity of the pistons. As a result of this and other constraints, the engine was limited to operating at very low power levels (about 38 HP/liter).

Examples of opposed piston engine constructions that remove wrist pins from inside pistons are found in Great Britain Patent 558,115 and in U.S. Pat. Nos. 7,156,056 B2 and 7,360,551 B2. In each case, there is no articulation of the piston-to-crankshaft linkage that is internal to the piston. Instead, joints external to the pistons couple the linear motions of the pistons to each of a pair of crankshafts located above and below the cylinders. The axes of the crankshafts lie in a plane that is normal to the axes of, and that bisects, the cylinders. Both crankshafts are connected to each pair of opposed pistons through multiple connecting rods. Consequently, very close tolerances must be maintained during manufacturing to avoid, or at least mitigate, misalignment between the connecting rods and external wrist pins that could result in undesirable side forces exerted on the pistons. A consequence of coupling both crankshafts to the single wrist pin of each piston is an over constraint condition whereby unequal elastic deformation of the coupling components can lead to significant deflection of the wrist pin in a direction orthogonal to the piston motion that produces undesirable side forces acting on the piston.

Accordingly, the potentially high power levels in two-stroke, opposed-piston engines have not been fully achieved by single crankshaft constructions with rocker assemblies because wrist pins are located inside the pistons. However, dual-crankshaft constructions in which the wrist pins have been removed from, and relocated outside of, the pistons have also not achieved full power potential due to side forces resulting from over constraint of the wrist pins.

SUMMARY

An object of this invention is therefore to provide a connecting linkage construction enabling opposed pistons to operate at high power levels.

Another object of this invention is to couple a piston to connecting linkage without limiting the load bearing capacity of the piston due to bearing size constraints.

Yet another object is to eliminate forces orthogonal to piston motion that are produced by over-constraint of multiple crankshafts with common connections to the pistons of an opposed-piston engine.

In general, these and other objects are achieved by a construction in which a piston is connected to a connecting linkage with a rolling thrust bearing which does not limit the load bearing capacity of the piston resulting from bearing size constraints.

In general, these and other objects are achieved by a construction in which a piston is connected to a connecting linkage by a rolling thrust bearing which transmits only those linkage forces that are parallel to the piston's motion.

In general, these and other objects are achieved by a construction in which a piston is connected to a connecting linkage by a rolling thrust bearing that eliminates forces that otherwise would be imparted to the piston skirt by movement of the upper end of a rocker arm.

In general, these and other objects are achieved with piston rolling thrust bearing constructions constituted of a pair of bearing plates, opposing linearly-grooved faces of which are disposed in a spaced alignment, with a rolling ball assembly positioned between the opposing faces to support relative movement between the bearing plates. The piston rolling thrust bearing is mounted to the open end of a piston skirt to compensate for non-axial motion relative to the piston axis due to the articulating motions of connecting elements and/or any structural misalignments within the drive train assembly.

In general, these and other objects are achieved with a piston rolling thrust bearing constituted of a pair of bearing plates having opposed, complementarily curved, linearly-grooved faces disposed in a spaced relationship with a rolling ball assembly positioned between the opposed faces to support relative movement between the plates. The rolling thrust bearing is mounted to the open end of a piston skirt with the curved face of the first bearing plate facing the interior of the piston.

When connecting linkage motion transverse to the piston axis is small, these and other objects are achieved with a piston rolling thrust bearing constituted of a pair of parallel flat bearing plates having opposed, flat linearly-grooved faces with a rolling ball assembly positioned therebetween to support relative movement between the plates.

BRIEF DESCRIPTION OF THE DRAWINGS

FIGS. 7A through 7F depict assembly of the first piston rolling thrust bearing embodiment.

FIGS. 10A-10F depict assembly of the second piston rolling thrust bearing embodiment.

DETAILED DESCRIPTION OF PREFERRED EMBODIMENTS

The piston rolling thrust bearing embodiments illustrated and described herein all incorporate a pair of spaced-apart bearing plates with a rolling ball assembly positioned therebetween that supports relative movement between the plates. The piston rolling thrust bearings are adapted to be mounted to a piston at the open end of the piston skirt. A rear side of a piston rolling thrust bearing includes a yoke for attaching the piston rolling thrust bearing to connecting linkage that connects the piston to at least one crankshaft. Although specific piston rolling thrust bearing embodiments with curved and planar bearing plate faces are disclosed, these are not intended to limit the application of the invention just to two bearing plate constructions.

Figure 1:
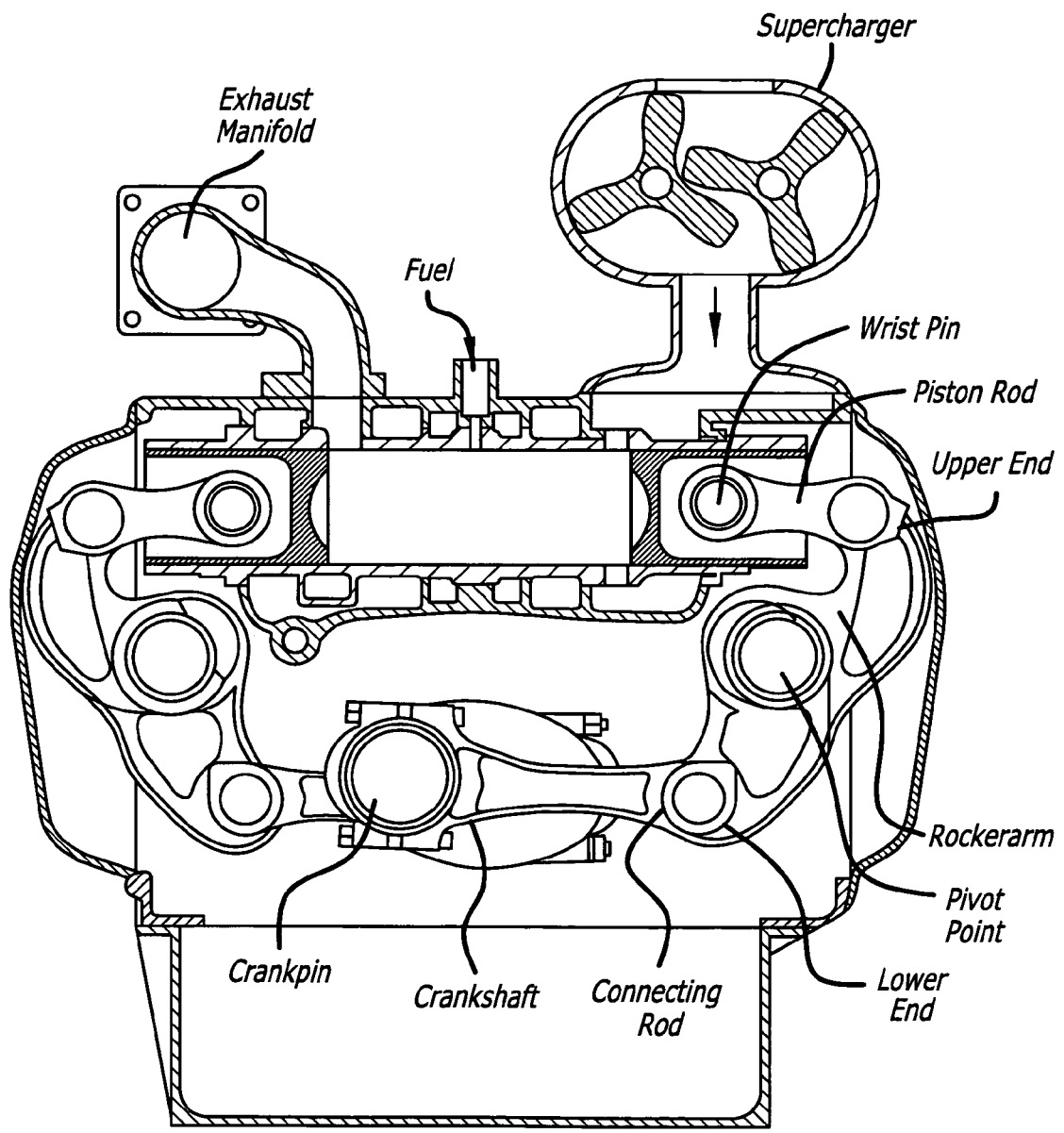
FIG. 1 is a side sectional schematic illustration of a prior art opposed piston engine.
Figure 2:
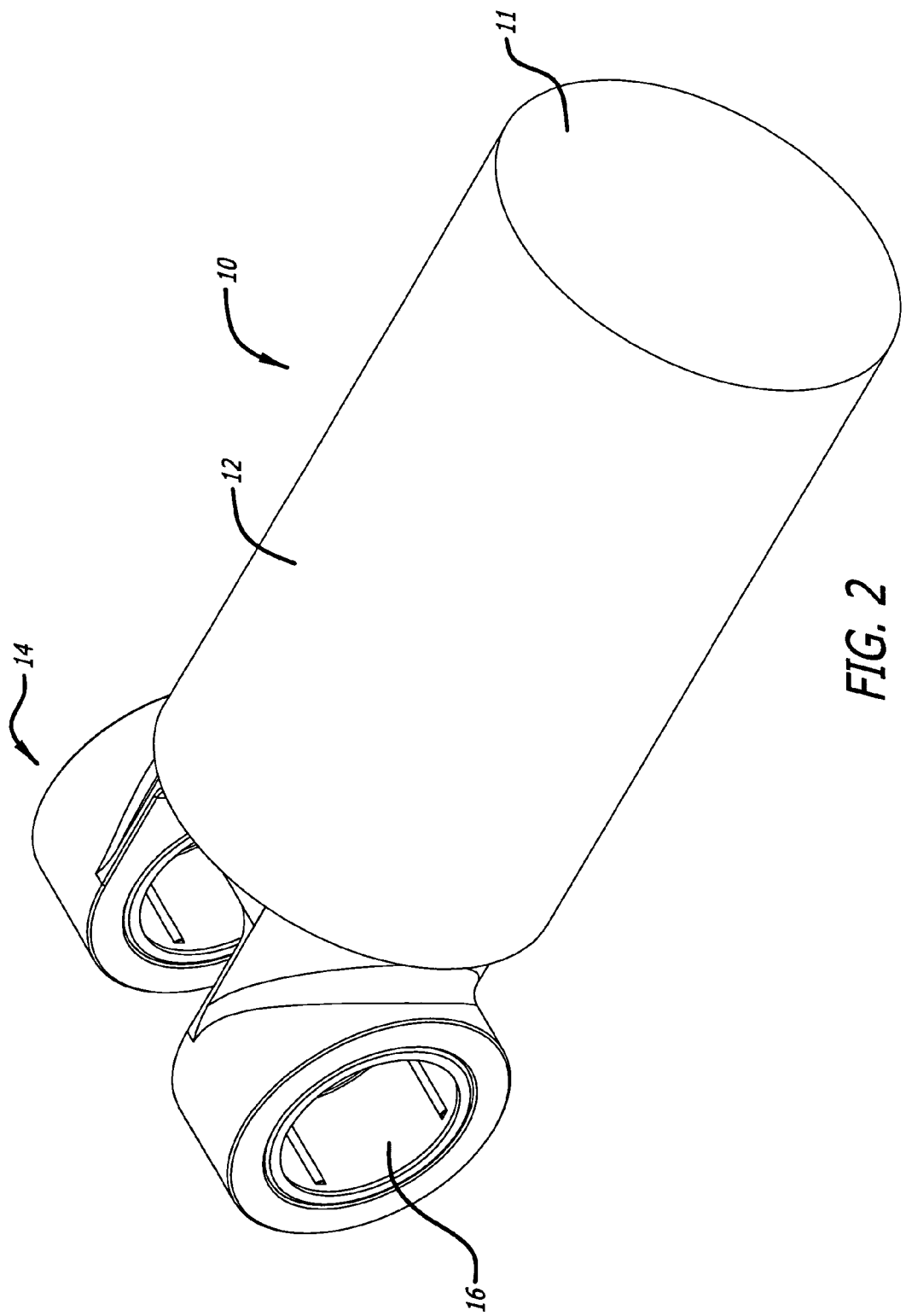
FIG. 2 is a side view of a piston rolling thrust bearing assembly installed in a piston.
Figure 5:
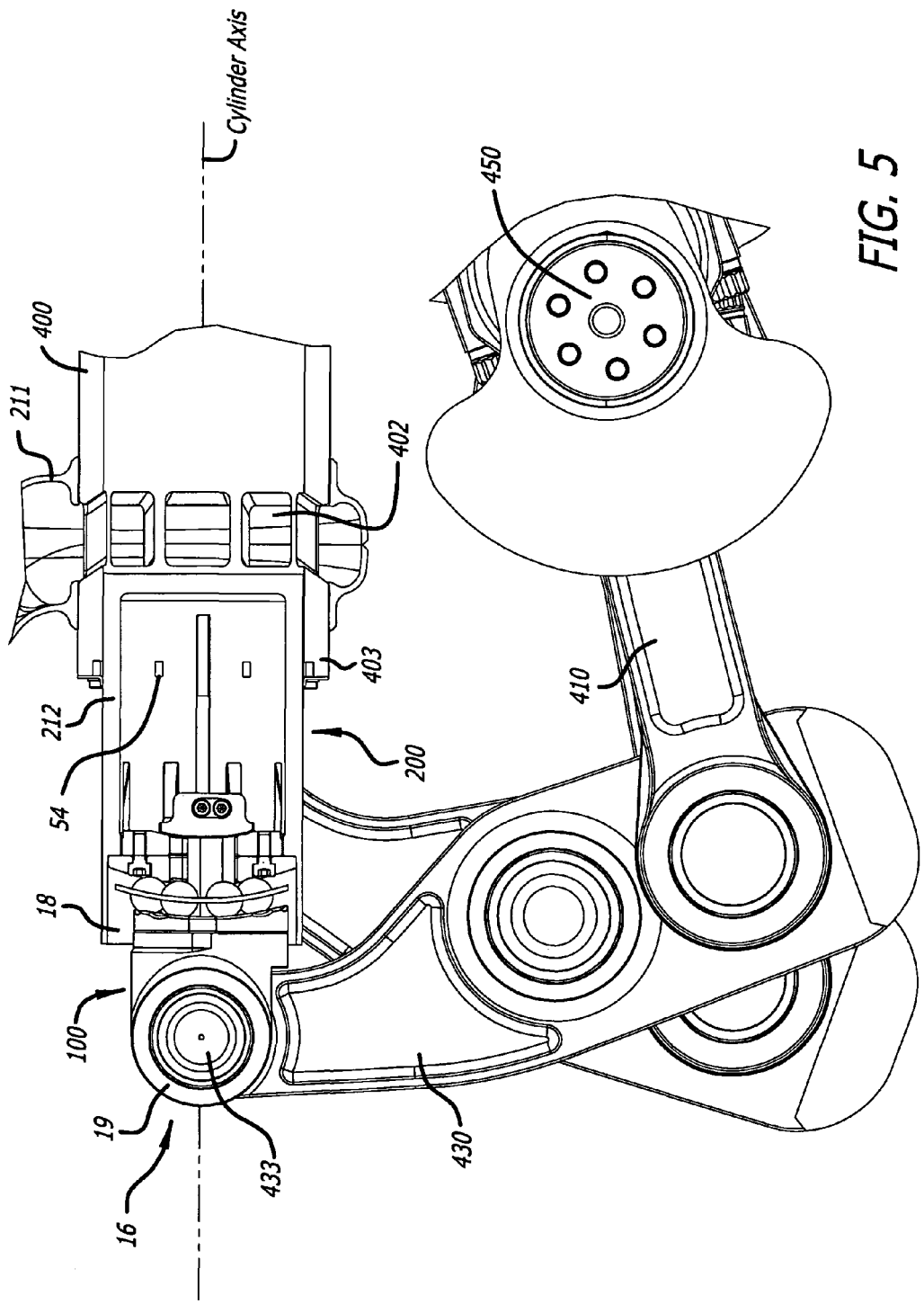
FIG. 5 is a side view of the first piston rolling thrust bearing embodiment installed in a piston and attached to the upper end of a rocker arm.

This specification and the accompanying drawings are directed to constructions for piston rolling thrust bearings that connect pistons to rocker arms, connecting rods, and other connecting linkage elements. In this regard, with reference to FIG. 2, a piston 10 with a crown 11 and a skirt 12 has a piston rolling thrust bearing 14 mounted to the open end of the skirt. A yoke 16 secured to the rolling thrust bearing provides an attachment point for connecting linkage. With reference to FIG. 5, the yoke 16 provides a bearing structure where a connecting linkage can be coupled to the piston by means of a bearing (or gudgeon) pin 19.

First Embodiment of a Piston Rolling Thrust Bearing

Figure 3:
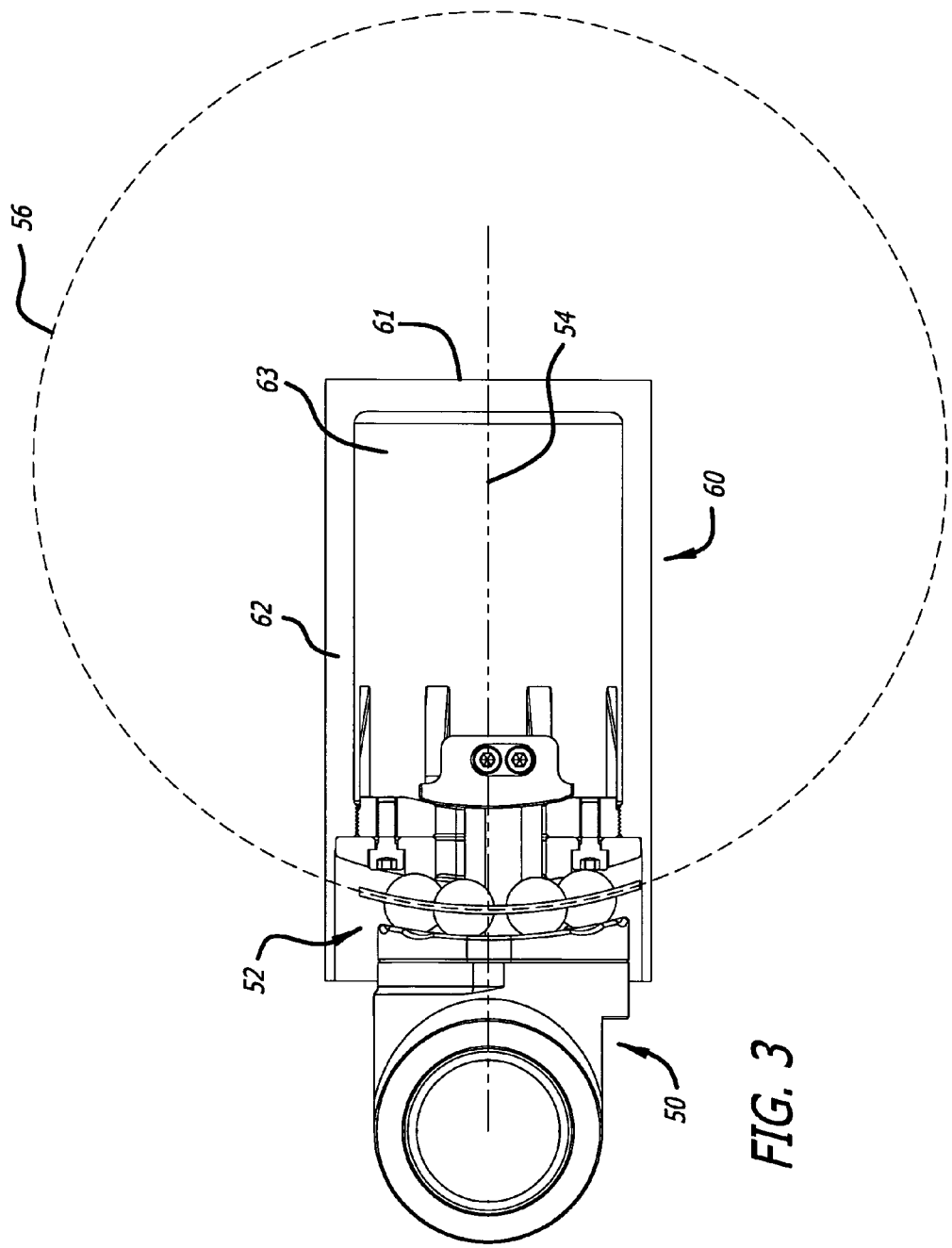
FIG. 3 is a cross sectional view of a first piston rolling thrust bearing embodiment which illustrates how the thrust bearing operates as a virtual wrist pin when mounted in a piston.

The conventional wrist pin bearing of four-stroke engines is typically a plain bearing that relies on hydrodynamic and squeeze film effects to prevent metal-to-metal contact. In two-stroke engines, the bearing interface is often under a unidirectional load that does not support entrainment of lubrication oil into the interface to supply this separation. Therefore two-stroke engines typically use roller or needle bearings that do not require unloading for their operation. But these bearings are difficult to size small enough to fit within the piston and cylinder while still carrying the peak loads of such applications as internal combustion compression-ignition engines where 200 bar combustion pressures are not uncommon. By relocating the bearing interface far away from the wrist pin axis, even outside the piston skirt and cylinder envelope, much larger and more plentiful rolling elements can be applied to the bearing function. But simply moving the wrist pin outside the skirt would radically change the skirt loading such that it would appear as a torque on the piston with the skirt edges supporting the loads rather than the skirt surfaces. By using a bearing sector whose rollers and race surfaces reside remotely from the piston crown while still locating a virtual axis of rotation of the bearing near the back surface of the crown, the kinematics of the conventional wrist pin can be preserved while gaining a degree of freedom in using larger bearing elements for handling higher loads. FIG. 3 is a schematic representation of a "virtual bearing" assembly 50 used to illustrate a first embodiment of the piston rolling thrust bearing. The virtual bearing assembly 50 occupies an arcuate sector 52 of a bearing very much larger than would fit within a piston 60. It should be clear from this figure that the axis of rotation 54 of the virtual bearing wrist pin 56 is at a location very near the back surface 63 of the crown 61, inside the skirt 62.

Figure 4:
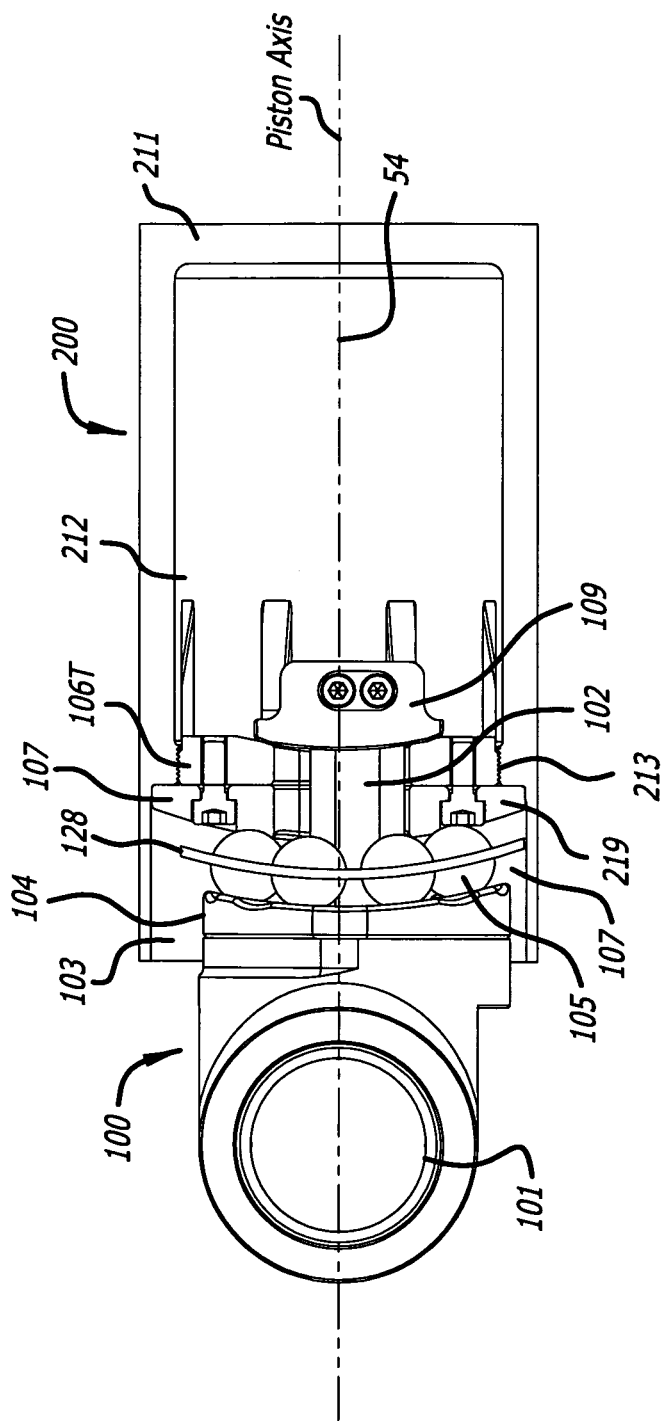
FIG. 4 is a side view of the first piston rolling thrust bearing embodiment installed in a piston.

FIG. 4 shows the piston rolling thrust bearing assembly 100 fully assembled. The assembly includes a yoke 101 and an elongated bearing retainer mount 102 that supports the assembly 100. A bearing plate 103 includes a concave, face 104 with a series of linear ball-race grooves that constrain roller bearing balls of a curved rolling ball assembly 105 to move on an arc about a piston thrust-bearing axis; these ball-race grooves 104g are clearly seen in FIG. 7A. The rolling balls of the curved rolling ball assembly 105 are held captive by a curved metal or plastic cage 108. The rolling balls of the rolling ball assembly 105 are further held captive by a bearing plate 106 having a convex face 107 in opposed alignment with the concave face 104. A series of linear ball-race grooves that match the grooves of the bearing plate face 104 are formed in the convex face 107; these ball-race grooves 107g are clearly seen in FIG. 7C. The opposing complementarily curved faces 104 and 107 and the ball-race grooves 104g and 107g constrain the rolling balls of the curved rolling ball assembly 105 to roll along an arc centered on the axis of the piston 200. The ball-race grooves 104g and 107g with the curved rolling ball assembly 105 constitute a curved linear roller bearing. A disc-shaped backing plate 106T is secured by threaded screws to the flat outer face of the bearing plate 106. The circumference of the backing plate 106T is threaded so as to seat the piston thrust bearing assembly 100 by engagement of threads 213 on the inner surface of the piston skirt 212, near the open end of the skirt. The diameter of the bearing plate 106 is larger than the diameter of the backing plate 106T so that as the backing plate engages the threads, the bearing plate is secured against motion by an annular ridge 214 formed in the bore of the piston skirt 212. A hydrodynamic retainer bearing 109 secured to the end of the elongated bearing retainer mount holds the piston rolling thrust bearing assembly 100 together.

As per FIG. 4, the piston thrust bearing assembly 100 is located remotely from the piston crown 211; it represents a virtual wrist pin whose axis of rotation 54 is located within the piston skirt 212, near the back surface of the crown 211. As per FIG. 5, presume that the piston 200 is one of a pair of opposed pistons disposed in a cylinder 400 of an opposed piston engine. The piston 200 is disposed in the exhaust end of the cylinder 400 where an exhaust port 402 is formed. The engine includes a connecting linkage to connect the piston 200 to a crankshaft. The connecting linkage includes a connecting rod 410 and a rocker arm 430. One end of the connecting rod 410 is attached to a crankshaft 450 and the opposite end to the rocker arm 430. The upper end 433 of the rocker arm 430 is coupled to the piston thrust bearing assembly 100 by the pin 19. The piston 200 reciprocates in the bore of the cylinder 400 between top dead center (TDC) and bottom dead center (BDC) positions. The piston 200 is shown at or near BDC. Preferably, when the piston 200 is at this position, the axis 54 of the virtual wrist pin bearing intersects the axis of the cylinder 400 at a position between the exhaust port 402 and the corresponding cylinder end 403.

Figure 6A:
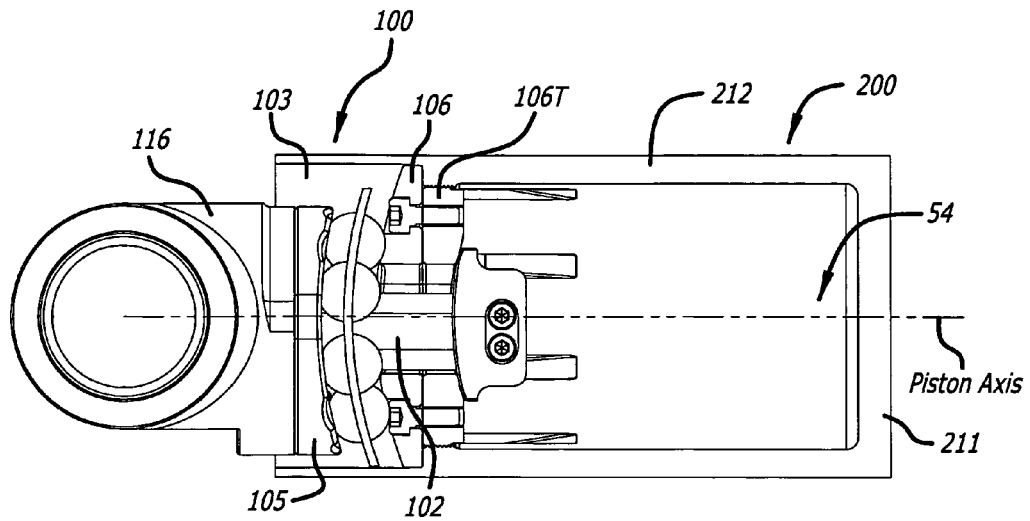
FIG. 6A is a cross sectional view of a piston showing the first piston rolling thrust bearing embodiment when the piston is at TDC (top dead center) and BDC (bottom dead center) positions.

As per FIG. 6A, when the piston 200 passes through TDC (near where combustion forces are at a maximum) and BDC (near where inertial forces are at a maximum), the piston rolling thrust bearing 100 is in straight alignment, (rotated 0°), with reference to the piston axis which perpendicularly intersects the virtual axis of rotation of the virtual wrist pin. As per FIG. 6B, when the piston 200 moves from TDC or BDC the rocker arm 430 (best seen in FIG. 5) urges the piston rolling thrust bearing 100 to pivot from the 0° centered position on an arcuate path towards a displaced angle. At crank angles of 90° and 270°, the axis 54 of the virtual wrist pin bearing is at the same point in the piston 200, but the piston rolling thrust bearing 100 has rotated off the axis of the piston. However, because of the rolling bearing structure, all forces acting upon the piston 200 are transmitted to the axis 54 of the virtual wrist pin bearing. In this regard, the yoke 101, elongated retainer mount 102, bearing plate 103, and curved rolling ball assembly 105 all rotate while the bearing plate 106 remains secured to the bore of the piston skirt 212. Therefore, with reference to FIG. 5, side forces that otherwise would be imparted directly to the piston skirt 212 by movement of the upper end 433 of the rocker arm 430 are directed to the axis 54 of the virtual wrist pin bearing by the moving parts of the rolling thrust bearing 100.

Figure 7C:
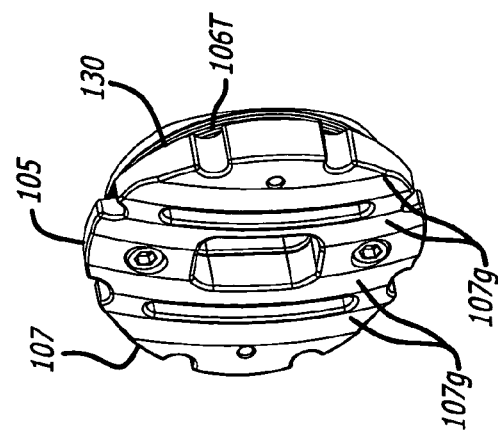
Figure 7B:
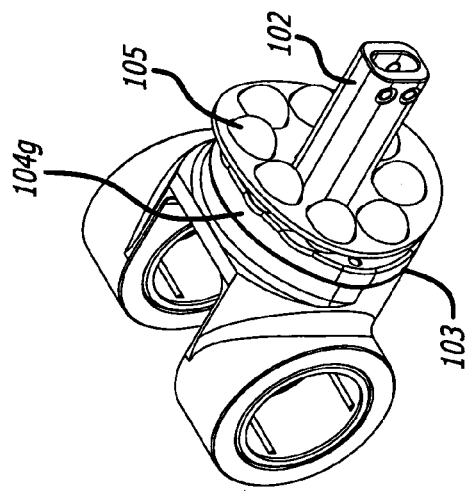
Figure 7A:
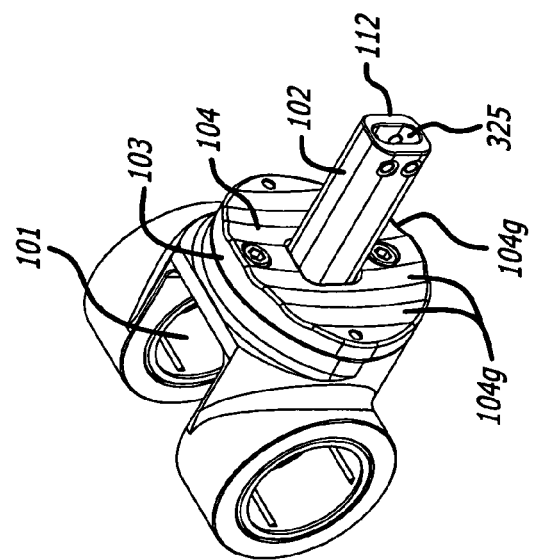

FIGS. 7A-7F illustrate the assembly of the piston rolling thrust bearing assembly 100. In FIG. 7A an elongate bearing retainer mount 102 is formed on or secured to a yoke 101. The first bearing plate 103 with concave face 104 is received on the retainer mount 102 and secured to the yoke 101 with the concave face 104 facing the end 112 of the retainer mount. The concave face 104 has formed in it a set of elongate spaced ball-race grooves 104g and a central slot through which the retainer mount 102 extends. FIG. 7B shows the curved rolling ball assembly 105 received on the retainer mount 102, against the concave face 104, with the rolling balls oriented in place by the ball-race grooves 104g. As per FIG. 7C, the second bearing plate 106 has a convex face 107 oriented to oppose the concave face 104 of the first bearing plate 103. The concave face 107 has formed in it a set of elongate linear ball-race grooves 107g and a central slot through which the retainer mount 102 extends. The backing plate 106T is secured to a flat outer surface of the second bearing plate 106. As per FIG. 7D, the second bearing plate 106, with the backing plate 106T secured thereto, is received on the elongate bearing retainer mount 102. The first and second bearing plates 103 and 106 are mutually oriented with the sets of ball-race grooves in the concave and convex faces 104 and 107 in opposing alignment, and the backing plate 106T facing the end 112 of the retainer mount 102. The opposed sets of ball-race grooves constrain the rolling balls for rolling movement in an arc centered on the axis of the piston to which the rolling thrust bearing assembly is mounted. As per FIG. 7E, the piston rolling thrust bearing assembly 100 is held together by a hydrodynamic retainer bearing 109 which is secured to the end 112 of the elongate bearing retainer mount 102, for example, by screws. The hydrodynamic retainer bearing 109 holds the piston rolling thrust bearing assembly 100 together under reverse inertial load to keep the rolling balls of the rolling ball assembly 105 loaded. A curved surface 120 (best seen in FIG. 7D) formed in the outer face of the backing plate 106T conforms to the bearing surface of the retainer bearing 109, allowing the retainer bearing to slide against the backing plate 106T. As per FIG. 7F, when assembled as illustrated in FIG. 7E, the rolling thrust bearing assembly 100 is secured to the piston 200 by engagement of the threaded portion of the backing plate 106T with the inner surface of the piston skirt 212, with the concave face 104 of the first bearing plate 103 facing toward the interior of the skirt. Although the backing plate 106T is configured as a disc, this bearing seating construction is not meant to be limiting. In another bearing seating construction, the seating element can be configured as a truncated cone with a wide end attached to the outer face of the bearing plate 106 and a narrow end threaded on a post fixed to the back surface of the piston crown.

Figure 8:
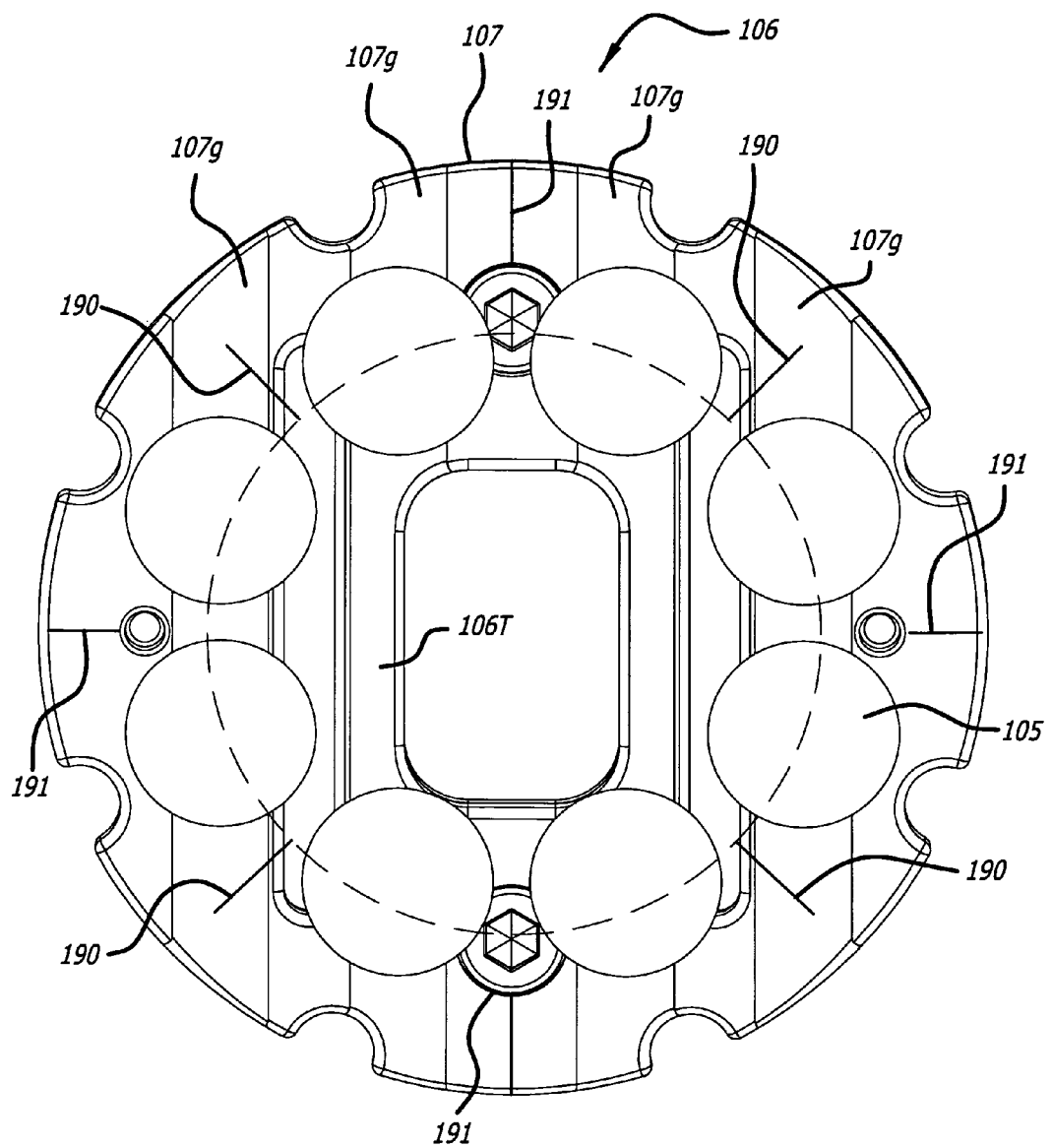
FIG. 8 is an enlarged plan view of the curved, linearly-grooved face of a flexible bearing plate.

FIG. 8 shows details not seen in FIG. 7C of a preferred construction of the second bearing plate 106. In FIG. 8 roller balls of the rolling ball assembly 105 are engaged in the set of elongate linear ball-race grooves 107g formed in the concave face 107 of the second bearing plate 106. Standard manufacturing processes introduce tolerances in the dimensions of the roller balls, the grooves, and the second bearing plate that can cause loss of contact between roller balls and grooves due to uneven loading of the roller balls. Accordingly, elongate linear slits 190 and 191 through the second bearing plate 106 are provided in interleaved radial patterns in order to permit to bearing plate to flex so as to ensure that all of the roller balls remain in contact with the grooves. The slits 190 extend outwardly from a central opening of the bearing plate 106 toward the circumferential periphery of the bearing plate 106, at least partly across outer grooves. The slits 191 extend inwardly from the circumferential periphery of the bearing plate 106. The interleaved patterns of slits define zones of the bearing plate 106 that can flex independently of each other in response to pressure of the roller balls. In order to accommodate flexion of the bearing plate zones, a shallow depression can be formed in the surface of the backing plate 106T that faces the bearing plate 106.

Second Embodiment of a Piston Rolling Thrust Bearing

Figure 9:
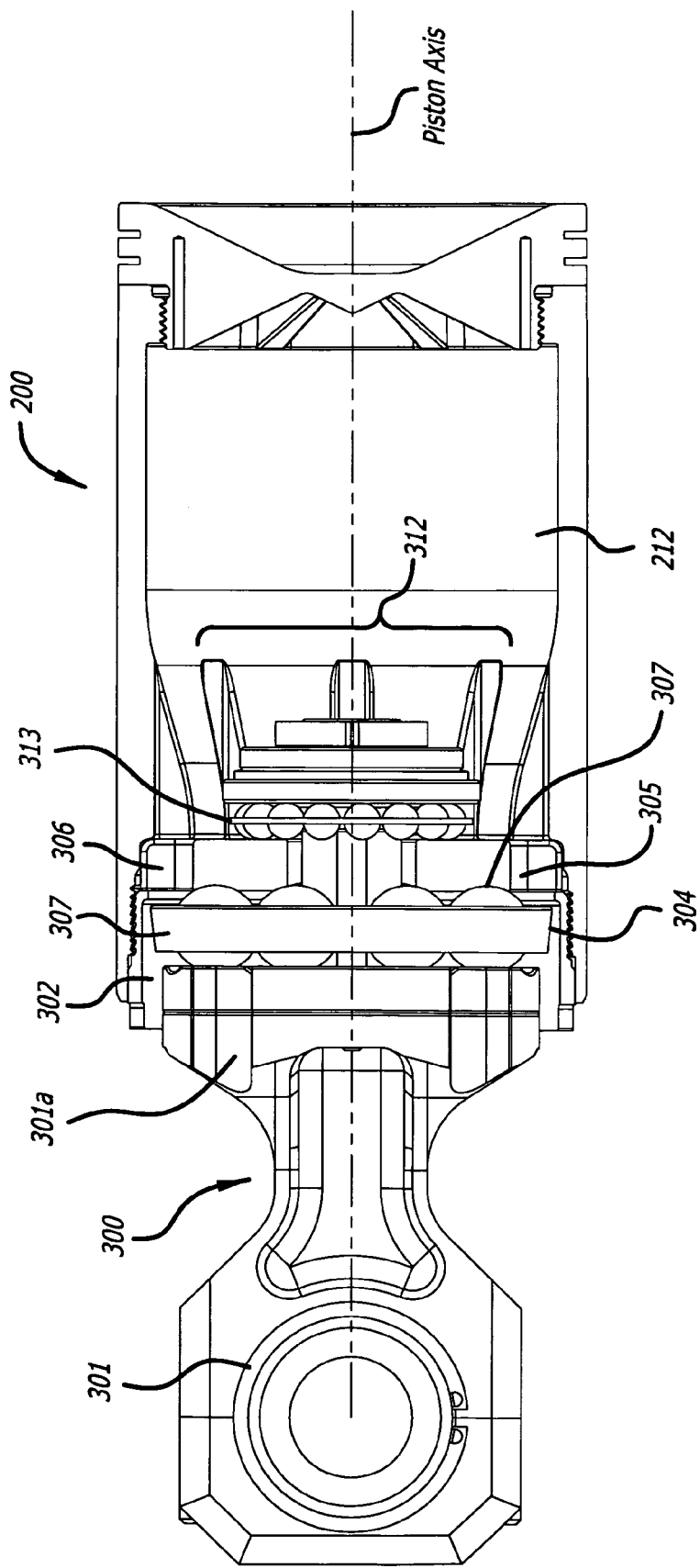
FIG. 9 is a side view of a second piston rolling thrust bearing embodiment installed in a piston and attached to a connecting linkage.
Figure 10C:
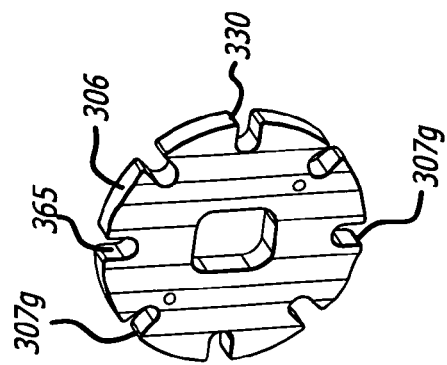
Figure 10B:
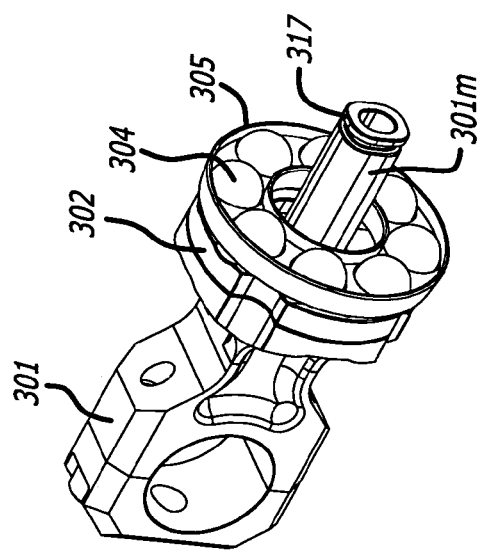
Figure 10A:
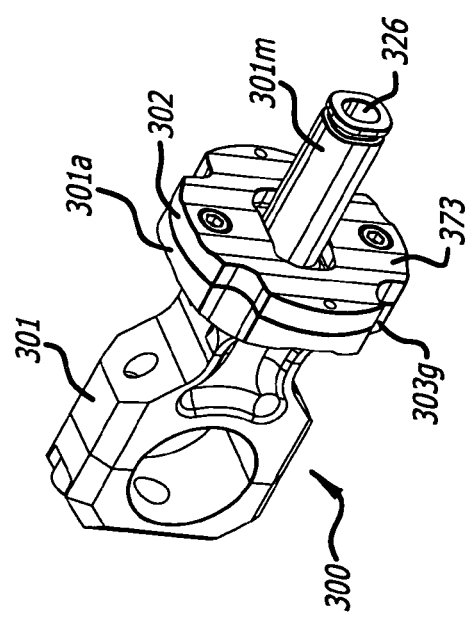
Figure 11:
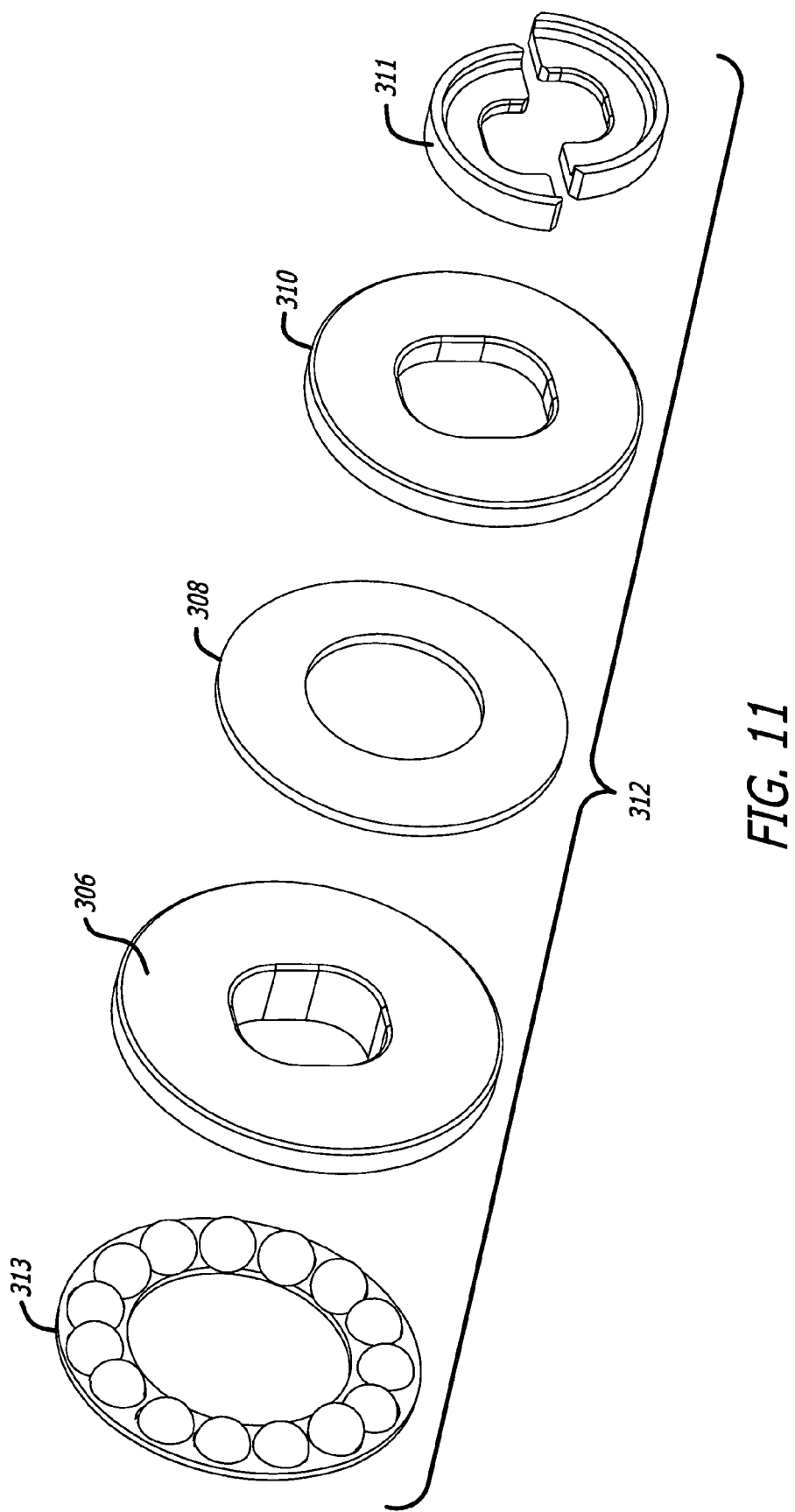
FIG. 11 is an exploded view of a reverse-thrust bearing assembly in the second piston rolling thrust bearing embodiment.

FIGS. 9-11 illustrate a second embodiment of a rolling thrust bearing assembly 300. In FIG. 9, the piston rolling thrust bearing assembly 300 is shown attached to a piston 200. The assembly 300 includes a wrist pin-bearing frame 301 that includes one half of a wrist pin-bearing support, an end plate and a yoke, all identified as 301 in this figure. The frame 301 includes an end plate 301a. A first flat bearing plate 302 with a linearly-grooved planar face 303 is secured to the end plate 301a, with the planar face 303 facing the interior of the piston skirt 212. A flat rolling ball assembly 304, including a set of rolling balls 305, is sandwiched between the first flat bearing plate 302 and a second flat bearing plate 306 having a linearly-grooved planar face 307 opposing the planar face 303. The planar faces 303 and 307 retain the rolling ball assembly 304 for rolling movement along a rolling track that perpendicularly intersects the piston axis. A thrust bearing retainer assembly 312 is mounted onto a thrust bearing retainer mount 301m to secure the entire rolling thrust bearing assembly 300 during thrust reversal.

Assembly of the rolling thrust bearing assembly 300 is shown in FIGS. 10A-10E. In FIG. 10A, an elongate bearing retainer mount 301m formed on or secured to the end plate 301a receives the first flat bearing plate 302, which is secured to the end plate 301a with the linearly-grooved planar face 303 facing outwardly. The ball-race grooves 303g formed in the face 303 are visible in this figure. In FIG. 10B, the flat rolling ball assembly 304 is received on the bearing mount 301m, with the rolling balls 305 aligned with the grooves 303g in the planar face 303. As per FIG. 10C, ball-race grooves 307g formed in the linearly-grooved planar face 307 of the second bearing plate 306. As per FIG. 10D, the second bearing plate 306 is received on the bearing mount 301m, so that the grooves in the planar face 307 are aligned with the rolling balls 305. As per FIG. 10E, the thrust bearing retainer assembly 312 is received on the end of the bearing mount 301m to secure the entire flat-thrust bearing assembly during thrust reversal. The bearing retainer assembly 312 is seated in the groove 317 (best seen in FIG. 10D) and thereby secured on the bearing mount 301m. As per FIG. 10F, when assembled as illustrated in FIG. 10E, the rolling thrust bearing assembly 300 is secured to the piston 212 by, for example, engagement between threads on the periphery of the second bearing plate and the inner surface of the piston skirt.

FIG. 11 is an exploded view of the thrust bearing retainer assembly 312. The bearing retainer assembly includes a Belleville spring washer 309 sandwiched between two end plates 308 and 310. This spring washer 309 assures that constant pressure is exerted in opposing directions when the thrust bearing retainer assembly 312 is secured to the bearing retainer mount 301m. A retainer thrust bearing 313 provides an interface between the flat surface of the second bearing plate 306 and the flat surface of the end plate 308 to compensate for any up or down motion at the bearing retainer mount 301m. The bearing retainer assembly 312 is secured to the bearing retainer mount 301m by seating split ring retainers 311 in the groove 317 on the end of the bearing retainer mount 301m (FIG. 10D), where the Belleville spring washer 309 is depressed so as to maintain pressure against the retainers 311.

Piston Cooling Provisions

Figure 6B:
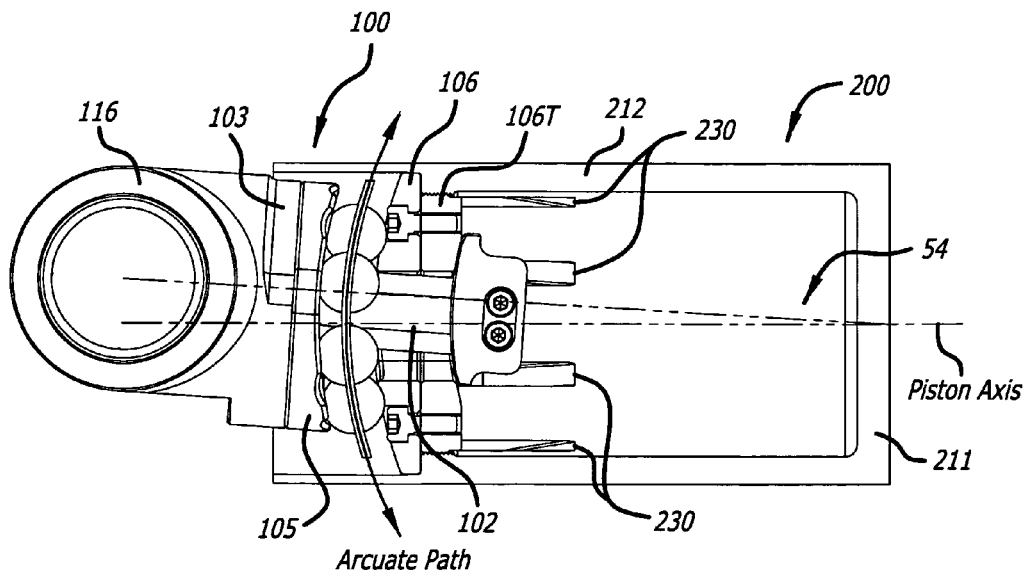
FIG. 6B is a cross sectional view of the piston showing the first piston rolling thrust bearing embodiment when the piston is at 90° and 270° positions.

The rolling thrust bearing assemblies described and illustrated herein may be utilized in an opposed-piston configuration wherein the pistons are cooled by application of a liquid coolant such as lubricating oil. In these configurations, the rolling bearing assembly constructions are adapted to accommodate the delivery of liquid coolant into the pistons and to enable outflow of the liquid coolant along the inside surfaces of the pistons. In this regard, the opposed-piston engines include elongated jets that extend through the open ends of the skirts and spray the liquid coolant into the pistons to cool the crowns. As FIGS. 7A and 9A show, the elongate bearing retainer mounts 102 and 301m are tubular with central bores 325 and 326 through which the jets extend. The central bores 325 and 326 of the retainer mounts 102 and 301m are wide enough to accommodate the jets while the pistons move between TDC and BDC. Liquid coolant exits the pistons by flowing along the inside surfaces of the pistons, and passing the rolling bearing assemblies via grooves on the inside surfaces and notches in the edges of the second bearing plates. For the first embodiment rolling thrust bearing, the notches 130 in the second bearing plate 106 are best seen in FIG. 7C; for the second embodiment rolling thrust bearing, the notches 330 in the second bearing plate 306 are best seen in FIG. 10C. In FIG. 6B, grooves on the inside surface of the piston skirt 212 are indicated by reference numeral 230.

The scope of patent protection afforded the novel constructions described and illustrated herein may be practiced in the absence of any element which is not specifically disclosed in the specification, illustrated in the drawings, and/or exemplified in the embodiments of this application. Moreover, although the invention has been described with reference to preferred embodiments, it should be understood that various modifications can be made without departing from the spirit of the invention. Accordingly, the invention is limited only by the following claims.

The invention claimed is:

1. A piston with a skirt having an open end and a rolling thrust bearing comprising first and second bearing plates with opposed, complementarily-curved faces and a curved rolling ball assembly comprising rolling balls held by a cage positioned between the curved faces to support relative arcuate movement between the bearing plates, in which the thrust bearing is mounted to the open end of the piston's skirt with the curved face of the first bearing plate facing the interior of the skirt and a rear side of the thrust bearing includes a linkage attachment point.

2. The piston with a rolling thrust bearing of claim 1, in which the first bearing plate is rotatably coupled to the second bearing plate and the second bearing plate is secured to the skirt and centered on a piston axis.

3. The piston with a rolling thrust bearing of claim 2, in which the curved rolling ball assembly is constrained to roll in an arc transverse to the piston axis by opposing sets of elongate grooves in the opposed curved faces of the first and second bearing plates.

4. The piston with a rolling thrust bearing of claim 3, in which the curved face of the first bearing plate has a concave shape and the curved face of the second bearing plate has a convex shape.

5. The piston with a rolling thrust bearing of claim 4, in which the thrust bearing has an elongated bearing retainer mount extending from the concave face of the first bearing plate, the curved rolling ball assembly, and the second curved bearing plate, and a reverse thrust bearing is secured to the elongated bearing mount and has a convex surface in sliding engagement with a groove in the concave face of the second curved bearing plate.

6. The piston with a rolling thrust bearing of claim 5, in which the linkage attachment point is constituted of spaced-apart bearings.

7. The piston with a rolling thrust bearing of claim 4, further including a pattern of slits defining flexible zones in the second bearing plate.

8. A piston with a skirt having an open end and a rolling thrust bearing constituted of a pair of parallel bearing plates and a rolling ball assembly positioned between opposing planar faces of the bearing plates to support relative movement between the planar bearing plates, in which the rolling ball assembly is constrained to roll on a plane transverse and perpendicular to the skirt axis by opposing sets of parallel, straight groves in the opposing planar faces, and in which the thrust bearing is mounted to the open end of the piston's skirt and a rear side of the thrust bearing includes a linkage attachment point.

9. The piston with a rolling thrust bearing of claim 8, in which a first planar bearing plate is slidably coupled to a second planar bearing plate with the rolling ball assembly moveably supported between the opposing planar faces and the second planar bearing plate is secured to the skirt and centered on a piston axis.

10. The piston with a rolling thrust bearing of claim 9, in which the thrust bearing has an elongated bearing retainer mount secured to the first thrust plat and extending through the rolling ball assembly and the second bearing plate, and a reverse thrust bearing is secured to the elongated bearing mount and has a rolling ball assembly in sliding engagement with the second bearing plate.

11. The piston with a thrust bearing of claim 10, in which the linkage attachment point is constituted of spaced-apart bearings.

12. A piston with a skirt having an open end and a rolling thrust bearing comprising a pair of spaced-apart bearing plates with opposing faces and a rolling ball assembly positioned between the opposing faces that supports relative movement between the bearing plates, in which the rolling ball assembly is constrained to roll by opposing sets of groves in the opposing faces, and in which the thrust bearing is mounted to the open end of the piston's skirt and a rear side of the thrust bearing extends out of the open end includes a linkage attachment point.

13. The piston with a rolling thrust bearing of claim 12, in which the opposing faces are curved or planar.

14. The piston with a rolling thrust bearing of claim 13, in which the curved opposing faces include a concave face on the first bearing plate and a convex face on the second bearing plate and the rolling ball assembly is curved.

15. A rolling thrust bearing comprising first and second bearing plates with opposed, complementarily-curved faces and a curved rolling ball assembly comprising rolling balls held by a cage positioned between the curved faces to support relative arcuate movement between the bearing plates.

16. The rolling thrust bearing of claim 15, in which the first bearing plate is rotatably coupled to the second bearing plate.

17. The rolling thrust bearing of claim 16, in which the curved rolling ball assembly is constrained to roll in an arc by opposing sets of elongate grooves in the opposed curved faces of the first and second bearing plates.

18. The rolling thrust bearing of claim 17, in which the curved face of the first bearing plate has a concave shape and the curved face of the second bearing plate has a convex shape.

19. The rolling thrust bearing of claim 18, including an elongated bearing retainer mount extending from the concave face of the first bearing plate, through the curved rolling ball assembly, and the second curved bearing plate, and a reverse thrust bearing is secured to the elongated bearing mount and has a convex surface in sliding engagement with a groove in the concave face of the second curved bearing plate.

20. The rolling thrust bearing of claim 15, further including a pattern of slits defining flexible zones in the second bearing plate.

* * * * *